H. J. FAVORITE.
CHURN.
APPLICATION FILED AUG. 24, 1917.
1,306,177.
Patented June 10, 1919.
2 SHEETS—SHEET 2.
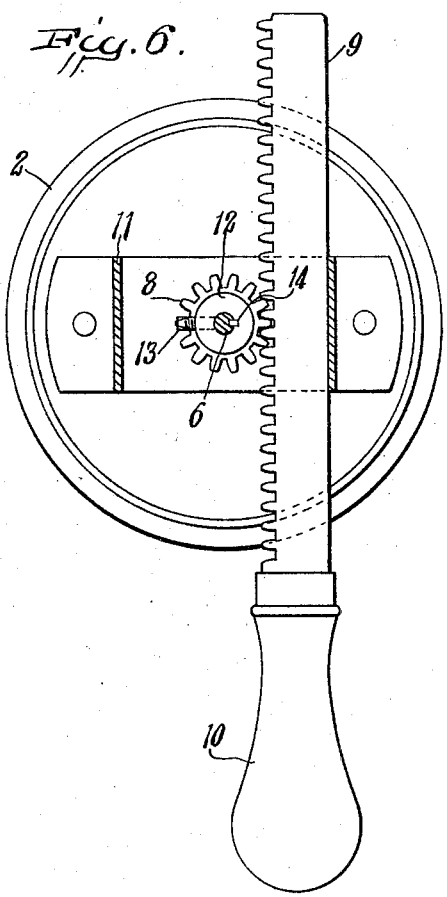
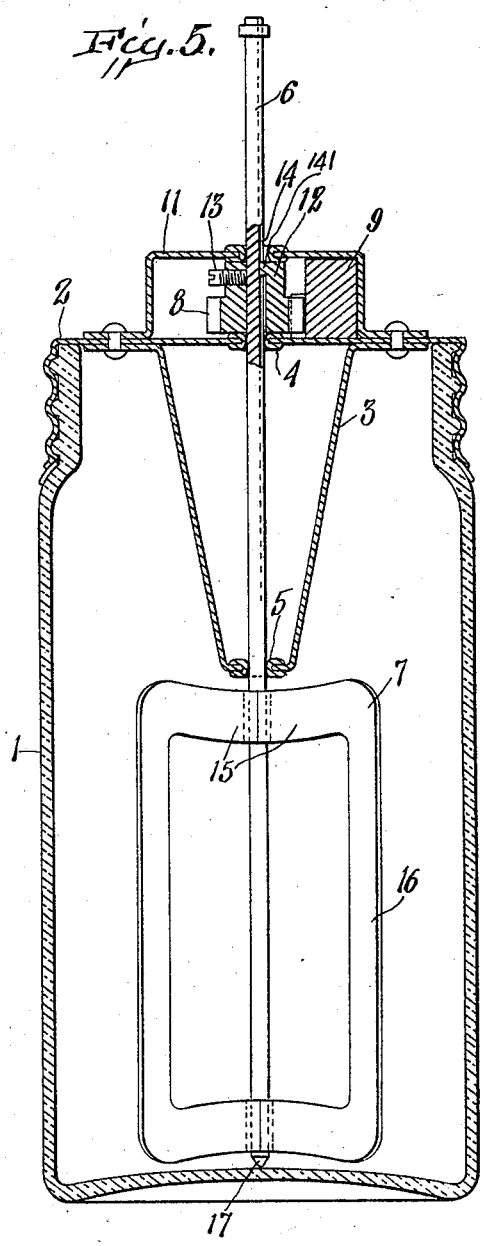
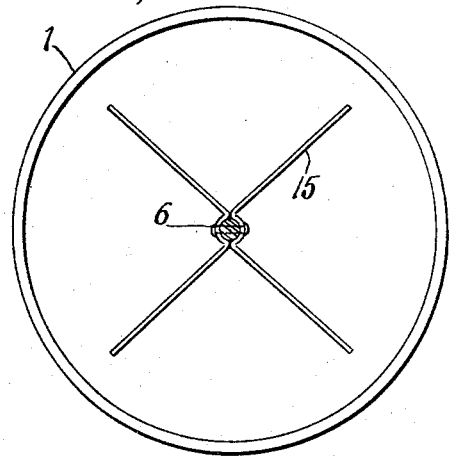
Inventor
Harry J. Favorite,
Toulmin & Toulmin,
Attorneys

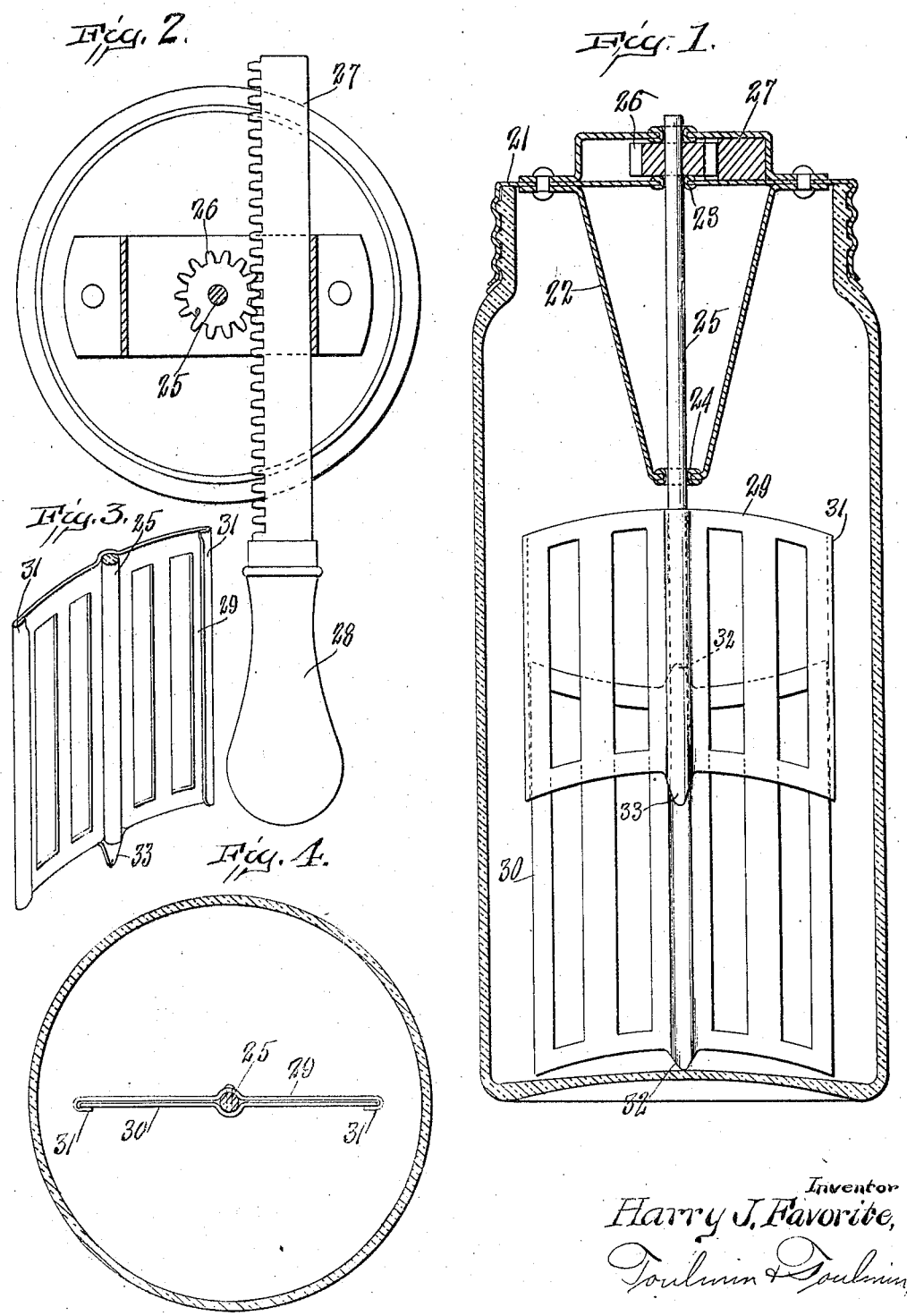

UNITED STATES PATENT OFFICE.

HARRY J. FAVORITE, OF TIPPECANOE CITY, OHIO.

CHURN.

1,306,177.  Specification of Letters Patent.  Patented June 10, 1919.

Application filed August 24, 1917. Serial No. 187,940.

*To all whom it may concern:*

Be it known that I, HARRY J. FAVORITE, a citizen of the United States, residing at Tippecanoe City, in the county of Miami and State of Ohio, have invented certain new and useful Improvements in Churns, of which the following is a specification, reference being had therein to the accompanying drawing:

This invention relates to churns and has for an object to improve the construction shown in Patent No. 1,202,415, Oct. 24, 1916, of which the present applicant is a joint inventor.

An additional object is to provide a churn which may be attached readily to a jar of a common type, the beater of which is adjustable for different sizes of jars.

Further objects are to provide a churn which may be produced at a lower cost of construction than that shown in the patent referred to and to provide a churn having a bearing on the bottom of the jar whereby the beater may extend close to the jar's bottom and thereby be adapted to churn small amounts of material when that is necessary.

Referring to the drawings,

Figure 1 is a central vertical section of the preferred form of my improved churn; Fig. 2 is a top plan view of the same; Fig. 3 is a perspective view of one of the beater sections; and Fig. 4 is a horizontal sectional view; Figs. 5 to 7, inclusive, show a modified form of churn, Fig. 5 being a vertical central section, Fig. 6 a plan view and Fig. 7 a horizontal section through the jar showing the beater blades.

The form shown in Figs. 5, 6, and 7 which is a modified form will be first described. Fig. 5 shows a jar 1 having the usual threaded top and there is provided a supporting member 2 threaded to engage the top of the jar. Depending from the supporting member is a spider frame or bracket 3, the supporting member having a bearing 4 and the spider frame being provided with a bearing 5. Passing through these two bearings is a shaft 6 carrying the beater 7. The beater is rigidly attached to the shaft and the shaft may be slid in the direction of its length through its bearings 4 and 5.

Loose on the shaft is a driving pinion 8 constructed to engage with a detachable rack bar 9 having a handle 10. The reciprocation of the rack bar 9 by the handle 10 serves to rotate the driving pinion 8 and thus through the shaft 6 serves to rotate the beater 7.

A supporting frame 11 is carried by the member 2 and this is cut away at opposite sides, as shown in Fig. 6, to permit movement of the rack bar 9. Directly under the guard 11 is a collar 12 which may be rigidly attached to the driving pinion 8. The pinion 8 and the collar 12 together take up the space between the supporting member 2 and the guard 11. The collar 12 is provided with a set screw 13 engaging the shaft 6 and serving to lock the shaft and the pinion 8 together. As an alternative the screw 13 may, if desired, ride in a keyway 14 cut in the shaft 6, or a projection 141 in the pinion 8 may ride in this key way.

If the projection 141 is provided or if the screw 13 rests lightly in the key way 14, the shaft 6 will be free to move downwardly in its bearings until the lower end thereof rests on the bottom of the jar and the shaft will remain there merely by its weight. If the set screw 13 is employed to lock the shaft 6 and pinion 8 together the shaft 6 should be adjusted to touch the bottom of the jar before the screw is tightened.

As shown there are four blades 15 comprising the beater and these are arranged at right angles to each other and have vertical strips 16. The shaft 6 ends at the bottom in a point or pivot 17 adapted to rest on the bottom of the jar.

It will be seen that with this construction the churn is adapted to be used with different sizes of jars. With a small jar, for example the usual pint size of Mason jar, the position of the parts will be about as shown in Fig. 5, the shaft 6 projecting some distance above the top of the jar. Reciprocation of the rack bar 9 serves to rotate the beater and churn the material in the jar. If the churn is attached to a larger size, such as a quart jar, the screw 13 may be loosened or if it simply rides in the key-way 14, the shaft 6 may slide downwardly in its bearings 4 and 5 and the pivot 17 will again rest on the bottom of the large size jar. Tightening the set screw 13 when that is necessary will then permit churning of the material in the larger size jar.

Referring now to Figs. 1 to 4, there is there provided a supporting member 21 which is shown as attached to a larger size jar, such as a quart size. There is the same bracket or spider 22 and bearings 23 and 24 for the churn shaft 25. The driving pinion 26 may be rigidly fast to the shaft 25 and it is oscillated by a rack 27 driven by a handle 28.

In this construction the beater is provided with two separate portions, an upper one, 29, fast to the shaft 25 and a lower one, 30, connected at its outer edges to the upper section 29. As shown in Fig. 3 the section 29 is provided with edges 31 which are turned over to form a groove in which the outer edges of the lower section 30 may ride. In this construction the beater has only two blades but these are each composed of a number of vertical strips having cut away portions between them, whereby an effective churning operation is assured.

The lower section 30 of the beater is provided with a pivot 32 which may rest on the bottom of the jar.

In the use of this form the two sections 29 and 30 of the beater are used on large size jars, the section 30 being adjustable relative to the section 29 by sliding it until the pivot 32 rests on the bottom of the jar. In case the device is to be used on a smaller size jar, the section 30 is detached and the section 29 then has its pivot 33 resting on the bottom of the small size jar.

Thus, in both forms of the device shown there is provided a beater which is adjustable for use on different size jars and whether used on a large or small jar the beater has a pivot at the bottom resting on the bottom of the jar and serving to prevent oscillation or wabbling of the beater. Also the provision of adjustment and the pivot pins permit of the beater blades being closer to the bottom of the jar than was practicable in the patented form for the reason that jars intended to have the same capacity vary slightly in size. Thus, with the patented form it was necessary to be certain that the beater did not touch the bottom of the jar and thus it was difficult to churn very small amounts of material. With the present constructions this difficulty is overcome as the blades are in all cases closely adjacent the bottom of the jar.

Having thus fully described my invention, what I claim as new and desire to secure by Letters Patent, is:—

1. In a churn, the combination, with a receptacle, bearings supported therein, a shaft passing through said bearings, and a beater blade secured to said shaft and having a section self adjustable axially thereon.

2. In a churn, the combination, with a receptacle, bearings supported therein, a shaft passing through said bearings, and a beater blade secured to said shaft and having a section self adjustable axially thereon and having its lower end adapted to bear against the bottom of the receptacle.

3. In a churn, the combination, with a receptacle, bearings supported therein, a shaft passing through said bearings, and a beater blade secured to said shaft and having a section adjustable axially thereon.

4. In a churn, the combination, with a receptacle, bearings supported therein, a shaft passing through said bearings, and a beater blade comprising a section secured to said shaft and a section adjustable axially thereon.

5. In a churn, the combination, with a receptacle, bearings supported therein, a shaft passing through said bearings, and a beater blade comprising a section secured to said shaft and a section free to move vertically to rest against the bottom of the receptacle.

6. In a churn, the combination, with a receptacle, bearings supported therein, a shaft passing through said bearings, and a beater blade secured to said shaft having a section secured thereto and free to move axially thereof and adapted to rest against the bottom of the receptacle.

7. In a beater blade, an actuator therefor, a section of said blade being adapted to engage the actuator and having guides on the edges thereof, and a section of said blade having edges projecting into said guides and adapted to move longitudinally therein.

8. In a beater blade, a section having a central depressed portion adapted to engage an actuator and having forming edges constituting guides and a second section having an oppositely disposed central depressed portion and having edges projecting into said guides and movable longitudinally therein.

9. In a beater blade, a section adapted to engage an actuator and having portions constituting a guide, a second section movable longitudinally in said guides and having an end portion adapted to support said section pivotally.

In testimony whereof, I affix my signature.

HARRY J. FAVORITE.

Copies of this patent may be obtained for five cents each, by addressing the "Commissioner of Patents, Washington, D. C."